(12) United States Patent
Höfler et al.

(10) Patent No.: US 7,343,207 B2
(45) Date of Patent: Mar. 11, 2008

(54) METHOD FOR THE OPERATION OF AN ELECTRONIC DEVICE

(75) Inventors: Werner Höfler, Eckental (DE); Michael Tiegelkamp, Pyrbaum (DE)

(73) Assignee: Siemens Aktiengesellschaft, Munich (DE)

( * ) Notice: Subject to any disclaimer, the term of this patent is extended or adjusted under 35 U.S.C. 154(b) by 268 days.

(21) Appl. No.: 10/499,745

(22) PCT Filed: Dec. 4, 2002

(86) PCT No.: PCT/DE02/04447

§ 371 (c)(1),
(2), (4) Date: Jun. 17, 2004

(87) PCT Pub. No.: WO03/052594

PCT Pub. Date: Jun. 26, 2003

(65) Prior Publication Data

US 2005/0080585 A1   Apr. 14, 2005

(30) Foreign Application Priority Data

Dec. 17, 2001 (DE) ............................... 101 61 923

(51) Int. Cl.
G05B 11/01 (2006.01)
G05B 15/00 (2006.01)
(52) U.S. Cl. .......................................... 700/17; 700/83
(58) Field of Classification Search ................ 700/17, 700/83
See application file for complete search history.

(56) References Cited

U.S. PATENT DOCUMENTS

| | | | |
|---|---|---|---|
| 5,650,831 A * | 7/1997 | Farwell | 348/734 |
| 6,088,028 A | 7/2000 | Gipalo | |
| 6,211,870 B1 * | 4/2001 | Foster | 715/744 |
| 6,359,636 B1 * | 3/2002 | Schindler et al. | 715/846 |
| 6,642,939 B1 * | 11/2003 | Vallone et al. | 715/721 |
| 6,920,614 B1 * | 7/2005 | Schindler et al. | 715/726 |
| 2002/0056112 A1 * | 5/2002 | Dureau et al. | 725/78 |
| 2003/0046700 A1 * | 3/2003 | Wilcox et al. | 725/60 |

FOREIGN PATENT DOCUMENTS

EP   0 367 709 A1   5/1990
WO   WO 00/45249   8/2000

OTHER PUBLICATIONS

Todd D. Hodes and Randy H. Katz, "A Document-based Framework for Internet Application Control", Proceedings of the 2nd Usernix Symposium on Internet Technologies and Systems, 1999, pp. 59-70.
Martin Fowler; "Separating User Interface Code"; IEEE Software; Mar./Apr. 2001; pp. 96-97; vol. 18, No. 2.
Angel R. Puerta; "A Model-Based Interface Development Environment"; IEEE Software; Jul./Aug. 1997; pp. 40-47; vol. 14, No. 4.
J. Braham Levy, "Object Oriented Interface to Matlab"; Institution of Electrical Engineers; IEE Colloquium on Advances in Computer-Aided Control System Design; Mar. 14, 1996; pp. 9/1-9/3; London, UK.

* cited by examiner

Primary Examiner—Ronald Hartman, Jr.

(57) ABSTRACT

A method is provided for operating an electronic device with control software controlled by means of an operating surface. An interface is disposed between the operating surface and the control software to decouple the operating surface from the control software and transfer any action initiable via the operating surface to the control software.

14 Claims, 1 Drawing Sheet

METHOD FOR THE OPERATION OF AN ELECTRONIC DEVICE

CROSS REFERENCE TO RELATED APPLICATIONS

This application is the US National Stage of International Application No. PCT/DE02/04447, filed Dec. 4, 2002 and claims the benefit thereof. The International Application claims the benefits of German application No. 10161923.5 filed Dec. 17, 2001, both of the applications are incorporated by reference herein in their entirety.

FIELD OF INVENTION

The invention relates to a method for the operation of an electronic device with control software that can be influenced in a known way by means of an operating surface.

BACKGROUND OF INVENTION

Such a method is generally known. A example of such an electronic device is a Personal Computer. An example of control software is a word processing program. Known word processing programs feature an individual operating surface (e.g. an user interface) by means of which for example the output to a printer of text typed in or a change of font size in which the text typed in is displayed can be initiated.

The disadvantage with such known methods for operating electronic devices is however that the the scope of the operating surface is frequently s extensive as to make it difficult to have an overview of the overall functionality of the control software and to find individual functions.

SUMMARY OF INVENTION

The object of the invention is thus to specify a method with which scope and structure of the operating surface can be flexibly arranged.

In accordance with the invention this object is achieved by the claims. To this end an interface is provided between operating interface and control software for forwarding to the control software all the actions that can be initiated via the operating surface.

In this case the starting point for the invention is the knowledge that software tools which are installed on a Personal Computer (PC) or on a PC-based programming device are used today for programming and project planning of Programmable Logic Controllers for example. These tools are used for programming the controllers and include functionalities such as editing, loading of programs or program sections from the controller or into the controller, the creation of memory cards (e.g. EPROMs), the configuring of the hardware used on the controller side as well as functionalities for commissioning, error diagnosis and maintenance of the system.

Because of the very high bandwidth of functionality and system performance both on the programming and the project planning side, the control software used is very powerful and complex. This means that although the control software is basically suitable for the smallest to the largest automation solutions, it is increasingly becoming more difficult to handle for small to medium-sized projects since for a concrete automation project only a particular small part of the total functionality will be needed.

This segment of the overall control software functionality needed depends on a variety of factors, of which just a few examples are:

different performance classes of automation devices used (e.g. Programmable Logic Controllers)

Degree of networking of the automation units at so-called cell and field bus level Typical programming guidelines for a segment (programming language, documentation, etc.)

In addition option packages which allow the control software to be expanded by further functions, e.g. high-level graphical languages or options for fault-tolerant and high-availability solutions are typically offered for scaling the functionality.

The advantage of the invention lies in the fact that introducing the interface decouples the operating surface from the control software, so that it is possible to get away from an operating surface previous statically assigned to all control software.

Useful further developments of this method are the object of the dependent claims.

When type and scope of the actions which can be initiated through the operating surface can be defined by setting the parameters of the interface, the operating surface itself can be changed by the parameterization of the interface and thereby adapted to individual requirements.

Advantageously each action which can be initiated via the operating surface is assigned to at least one function category, in which case the parameterization of the interface includes an option for selecting individual actions which can be selected via the operating surface and in which case selection of an action of a specific function category automatically leads to the selection of all actions of the same function category. This guarantees that even with an individual parameterization of the interface and thereby configuration of the operating surface, logically contiguous functions cannot be separated, so that the operability of the control software remains guaranteed without the user setting the parameters for the interface having to know possible dependencies between individually selectable actions.

The determination of a function category and the definition of the association of an action with one or more of the function categories requires significant skill. On the one hand it is necessary to ensure that dependencies between individual actions are taken into account, i.e., that logically associated actions are not separated. On the other hand the set of actions automatically included in the operating surface should remain restricted to make the operating surface easier to understand.

Within the function categories at least one function category is provided for which inclusion of its actions in the operating surface is obligatory. With regard to all the actions which are assigned to such a function category, referred to below as an "obligatory function category", a user does not have the any choice when parameterizing the interface since these actions are indispensable for influencing the control software.

To make it easier to access this data the function category of each action which can be initiated via the operating surface is advantageously stored in a function category database.

When the function category database can be edited by the user, the user can adapt to their own needs the relevant function categories of individual actions that can be initiated via the operating surface and especially change the grouping of individual actions in a group of the same function category or add new function categories to be able to map additional groupings. Furthermore individual actions can be assigned to the obligatory function category or assignments to the obligatory function category can be cancelled. In the same way assignments to every other function category can adapted and modified.

When the control software comprises at least one software application, the parameterized operating surface not only relates to an individual software application but where necessary to a plurality of software applications which interoperate to form the actual control software.

Advantageously the parameterizatlon of the interface is stored in an operating surface-specific file 7 or 8, so that the effort required for parameterizing the interface is retained.

Also advantageously an operating surface-specification file is loaded to parameterize the interface, so that it is easy to change back and forth between different parameterizations of the interface and—along with this—between different operating surfaces.

BRIEF DESCRIPTION OF THE DRAWING

An exemplary embodiment of the invention is explained in more detail below based on the drawing In this the single FIGURE shows FIG. 1 a block diagram of control software with an operating surface, where an interface is provided between control software and operating surface for forwarding to the control software all the actions that can be initiated via the operating surface

DETAILED DESCRIPTION OF INVENTION

Figure 1:
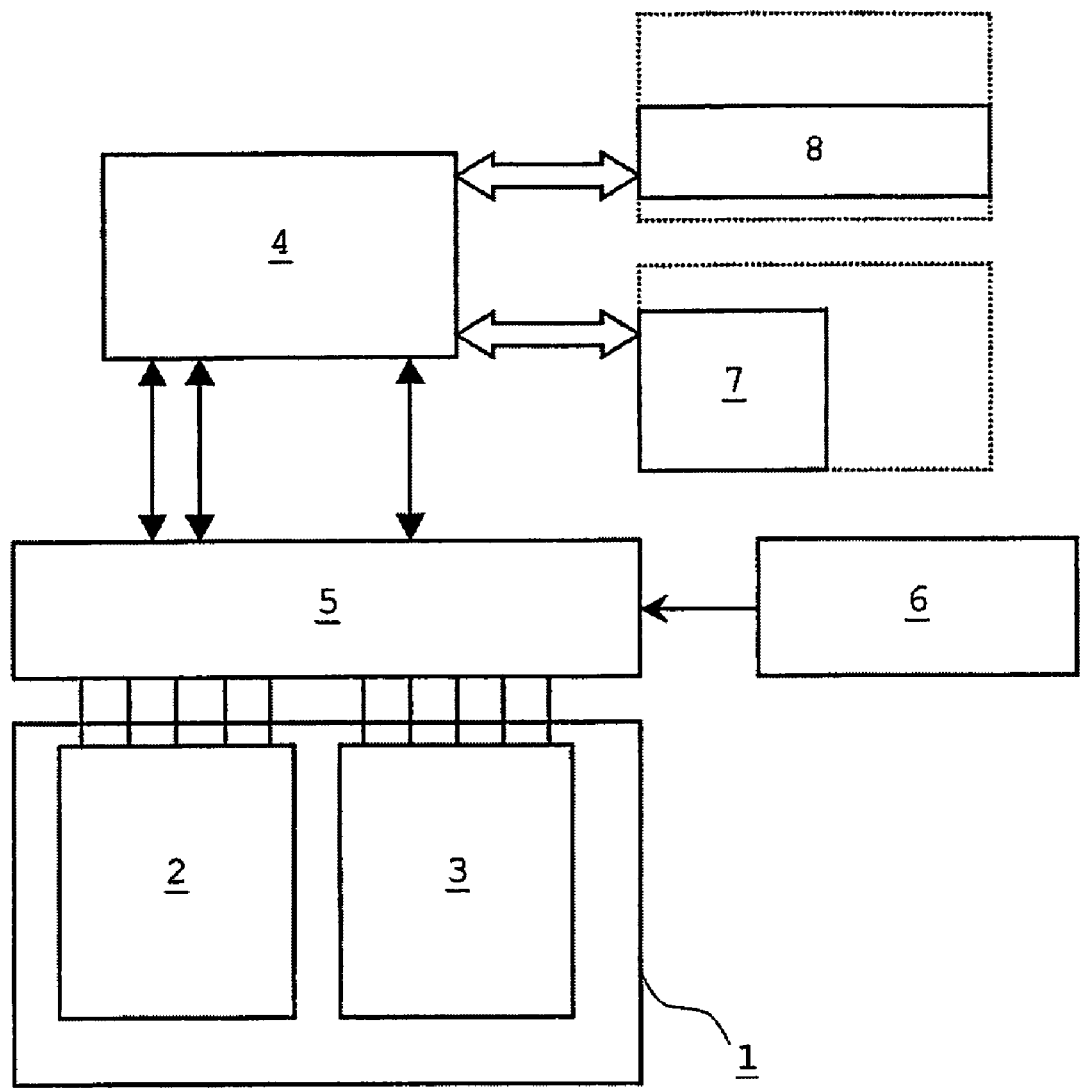

FIG. 1 shows control software 1 with a first software application 2 and a second software application 3. The number of software applications 2, 3, which together form the control software 1 vary depending on the application. The simplest case is that the control software is formed by a single software application 2, 3.

The control software 1 runs in a generally known fashion on at least one electrical device (not shown), e.g. a process computer, a Programmable Logic Controller, a programming device or similar. The control software 1 in this case can be influenced in the usual way by means of an operating surface 4 whereby actions are initiated which cause individual functionalities of the control software 1 to be processed. The initiation of an action here consists for example of selecting an option "Save" of the operating surface 4, where this selection causes the processing of the corresponding functionality of the control software to save processed data.

In the same way "between" operating surface 4 and control software 1 is an interface 5 for forwarding to the control software 1 all actions that can be initiated via operating surface 4. Type and scope of actions that can be initiated via the operating surface 4 is determined through parameterization of the interface 5. Each action that can be initiated via the operating surface 4 corresponds to one of the visible components of the operating surface, also called the "user interface", in the generally known variant. Examples of such components which might be mentioned are an entry in a pull-down menu, a checkbox, a radio button, a tab.

Through the parameterization of interface 5 the number of visible components and if necessary, a hierarchical position of individual such components in a resulting operating surface structure are influenced.

Each action which can be initiated via the operating surface 4 is assigned to at least one function category. A specific function category is thus referenced by a unique identifier, in which case each action assigned to this function category is linked to this identifier An assignment of each action to at least one function category makes it easier to group it. A first function category is provided for example for grouping all actions which relate to access by control software 1 to a non-volatile memory medium (not shown), such as a hard disk or a diskette drive.

The parameterization of interface 5 includes an option of selecting individual actions which can be initiated via operating surface 4, e.g. for selecting an action for storing data. Selecting such an action leads automatically to the selection of all actions of the same function category, so that when the data storage action is selected an action to load data is also automatically included in operating surface 5.

The function category of each action which can be initiated via the operating surface 4 is stored in a function category database 6. For parameterizing the interface 5 for selection of a specific action in the operating surface 5, the function category database 6 is used to determine further actions of the same function category and thereby included automatically in the operating surface 5.

Thus the invention can be briefly presented as follows:

A method is specified for the operation of an electronic device with control software 1 which can be influenced by means of an operating surface 4, in which a decoupling between operating surface 4 and control software 1 is achieved by providing an interface between operating surface 4 and control software 1 for forwarding to control software 1 all actions which can be initiated via operating surface 4.

The invention claimed is:

1. A method for operating an electronic device, comprising:

providing a control software for operating an electronic device in response to an user interface;

providing an intermediary interface connected between the user interface and the control software for forwarding to the control software actions initiated via the user interface;

configuring the intermediary interface to selectively associate an action selectable at the user interface with a functionality of the electronic device to be processed by the control software while remaining connected between the user interface and the control software; and operating the electronic device via the user interface;

wherein actions initiated via the user interface are determined by parameterization of the interface;

an action initiated via the user interface is assigned to at least one function category, the parameterization of the interface comprises an option for selecting individual actions initiated via the user interface, and selecting an action of a particular function category automatically leads to the selection of all actions of the same function category.

2. A method according to claim 1, wherein the function categories are stored in a function category database.

3. A method according to claim 2, wherein the function category database is edited by the user.

4. A method according to claim 3, wherein the control software comprises at least one software application.

5. A method according to claim 2, wherein the control software comprises at least one software application.

6. A method according to claim 1, wherein the control software comprises at least one software application.

7. A method according to claim 1, wherein the control software comprises at least one software application.

8. A method according to claim 1, wherein a parameterization of the interface is stored in an user interface specification file.

9. A method in accordance with claim 8, wherein the user interface specification file is loaded for parameterizing the interface.

10. A method according to claim 1, wherein the parameterization of the interface is stored in an user interface specification file.

11. A method according to claim 1, wherein the user interface comprises a plurality of components corresponding to a plurality of actions initiated via the user interface, and further comprising enabling visible ones of the plurality of components by a parameterization of the intermediary interface.

12. A system for operating an electronic device, comprising:
- a control software actuated by an user interface; and
- an intermediary interface connected between the user interface and the control software for forwarding to the control software all actions initiated via the user interface, wherein the intermediary interface is selectively configured to adapt a scope of actions selectable at the user interface with a scope of functionalities to be processed by the control software; and wherein
- the intermediary interface is selectively configured to associate selected actions initiated via the user interface with a function category, and to select all actions associated with the function category upon a selection via the user interface of any one action associated with the function category for operating the electronic device.

13. A system according to claim 12, wherein the actions initiated via the user interface is determined by parameterization of the interface.

14. A system for operating a programmable logic controller, said system comprising:
- a control software for controlling the programmable logic controller, the control software comprising at least two distinct software applications;
- an user interface for actuating the distinct software applications in the control software;
- an intermediary interface connected between the user interface and the control software for forwarding to the distinct software applications in the control software one or more actions initiated via the user interface, wherein the intermediary interface is configured to adapt a scope of the actions selectable at the user interface with a scope of functionalities to be processed by the control software;
- a database for storing a plurality of actions initiated by the user interface, the plurality of actions being categorized in accordance with a predefined function category respectively assigned for each of the distinct software applications in the control software, the categorized plurality of actions being accessed by the intermediary interface to determine the action initiated by the user interface for operating the programmable logic controller.

* * * * *